(12) United States Patent
Hampe et al.

(10) Patent No.: US 7,789,429 B2
(45) Date of Patent: Sep. 7, 2010

(54) BODYWORK STRUCTURE OF A MOTOR VEHICLE WITH A SUSPENSION STRUT DOME

(75) Inventors: Rene Hampe, Mulheim an der Ruhr (DE); Lothar Patberg, Moers (DE)

(73) Assignee: ThyssenKrupp Steel AG, Duisburg (DE)

( * ) Notice: Subject to any disclaimer, the term of this patent is extended or adjusted under 35 U.S.C. 154(b) by 342 days.

(21) Appl. No.: 11/574,940

(22) PCT Filed: Sep. 6, 2005

(86) PCT No.: PCT/EP2005/009558

§ 371 (c)(1),
(2), (4) Date: Jan. 2, 2008

(87) PCT Pub. No.: WO2006/027208

PCT Pub. Date: Mar. 16, 2006

(65) Prior Publication Data

US 2008/0179871 A1    Jul. 31, 2008

(30) Foreign Application Priority Data

Sep. 9, 2004   (DE) .................. 10 2004 043 570

(51) Int. Cl.
*B62D 21/11* (2006.01)
(52) U.S. Cl. .............. 280/788; 280/124.147; 280/124.155
(58) Field of Classification Search ......... 280/788, 280/124.109, 124.142, 124.145, 124.146, 280/124.147, 124.148, 124.149, 124.154, 280/124.155, 124.179, 86.752; 296/193.08, 296/193.09, 198, 203.01, 203.02, FOR. 115; 267/220
See application file for complete search history.

(56) References Cited

U.S. PATENT DOCUMENTS

| | | | | |
|---|---|---|---|---|
| 5,382,044 A | * | 1/1995 | Smith et al. | 280/124.109 |
| 5,409,254 A | * | 4/1995 | Minor et al. | 280/124.166 |
| 6,135,498 A | | 10/2000 | Vlahovic | |

FOREIGN PATENT DOCUMENTS

| | | |
|---|---|---|
| DE | 19630647 | 5/1998 |
| DE | 19941907 | 9/2000 |
| FR | 2221295 | 11/1974 |
| JP | 04055173 A * | 2/1992 |
| JP | 2003137132 | 5/2003 |

* cited by examiner

*Primary Examiner*—Ruth Ilan
*Assistant Examiner*—Keith Frisby
(74) *Attorney, Agent, or Firm*—Proskauer Rose LLP

(57) ABSTRACT

The invention relates to a suspension strut top mounting (1) in a body structure of a motor vehicle. The suspension strut top mounting (1) consists of two half-shells (2, 3) which are connected together in a rigid manner on the outer edge thereof (4, 5) and form a cavity (4) therebetween and are placed on top of each other in the support region (7) of the suspension strut top mounting (8). The suspension strut top mounting (1) is integrated into the body structure as a connecting node for adjacent hollow profiles (10, 12) of the body structure such that it reinforces and delivers a positive contribution to the crash behavior of the vehicle structure.

5 Claims, 4 Drawing Sheets

BODYWORK STRUCTURE OF A MOTOR VEHICLE WITH A SUSPENSION STRUT DOME

FIELD OF THE INVENTION

The invention relates to a bodywork structure of a motor vehicle, which is formed from longitudinal and transverse load-bearing members 10, 12, designed as hollow profiles, and which has a suspension strut dome 1, which is formed as a shell made of sheet steel with a sheet reinforcement in the support area 7 of the suspension strut 8 and forms a connection node for adjacent hollow profiles 10, 12, of the bodywork structure.

BACKGROUND OF THE INVENTION

Bodywork structures of motor vehicles which are formed from longitudinal and transverse load-bearing members designed as hollow profiles and have a suspension strut dome, are known in a variety of designs.

With a known bodywork structure (JP 2003137132 A), a longitudinal member running in curved fashion with a hat-shaped profile is connected laterally to an upper and lower longitudinal member and forms part of a wheel housing. A suspension strut dome of this kind does not make any significant contribution to the bracing of the bodywork structure and the crash behaviour of the vehicle. This means that the other parts of the vehicle structure must be dimensioned to be of corresponding strength, which leads to increased vehicle weight.

With a known bodywork structure of the type referred to in the preamble (DE 196 30 647 A), the suspension strut dome is designed as a single-shell spatial moulding. The suspension strut dome makes an insignificant contribution towards increasing the rigidity of the bodywork structure.

Finally, a load-bearing structure for a suspension strut of a motor vehicle is known (DE 199 41 907 A1), which consists of an outer shell-shaped part and connected to it a partially shell-shaped inner part. Both parts are connected to one another at their edges. The inner part serves to reinforce the outer part. With such a load-bearing structure, however, the inner part is cut out in the support area of the suspension strut, such that the entire support load must be taken over by the outer part. Accordingly, the support function, as well as the improvement of the rigidity of the bodywork structure overall, is not provided by a load-bearing structure such as this.

SUMMARY OF THE INVENTION

The invention is based on the object of providing a bodywork structure of the type referred to in the preamble, with which the rigidity of the bodywork structure is improved by the suspension strut dome, without this being associated with any substantial increase in the vehicle weight.

This object is resolved with a bodywork structure of the type referred to in the preamble in that the suspension strut dome is formed from two half-shells, which are in contact with one another with the formation of a cavity between them in the support area of the suspension strut dome and are connected to one another at their outer edges.

The advantages of the invention lie in the fact that, because of its integration into the vehicle structure and its two half-shells forming a cavity between them, the suspension strut dome substantially improves the rigidity and therefore the crash behaviour of the vehicle. This higher rigidity of the bodywork structure in the area of the suspension strut dome is achieved by the two half-shells forming a cavity between them, and not due to any correspondingly increased use of material. Since reinforcement for the suspension strut in the support area is produced due to the fact that the two areas of the half-shells lie in contact with one another in the support area of the suspension strut dome, the doubling of the sheet metal in the support area can be dispensed with, which is otherwise usual and increases the cost and effort of manufacture.

In order to make optimum use of the space available in the wheel housing for the suspension strut dome, in the sense of increasing the rigidity of the bodywork structure, one embodiment of the invention makes provision for the connection of the outer edges of the two half-shells to be free of any overlap. Space which would otherwise be taken up by the outer connection flange of the half-shells is therefore available for the suspension strut dome.

In an embodiment according to the invention, due to the design of the suspension strut dome as a connection node for adjacent hollow profiles, the bodywork structure forms a highly integrated component. It therefore also makes a contribution to crash behavior. There are various possibilities for the connection of the hollow profiles of the bodywork structure to the connection nodes. Preferably, the ends partially enclose the suspension strut dome serving as a connection node and are connected to it by metallurgical joining. As an alternative, however, the hollow profiles of the bodywork structure can also be enclosed by the suspension strut dome serving as a connection node, and be connected to it by metallurgical joining.

BRIEF DESCRIPTION OF THE FIGURES

The invention is explained in greater detail hereinafter on the basis of drawings representing embodiments in diagrammatic form. Specifically, these show.

DETAILED DESCRIPTION

Figure 1:
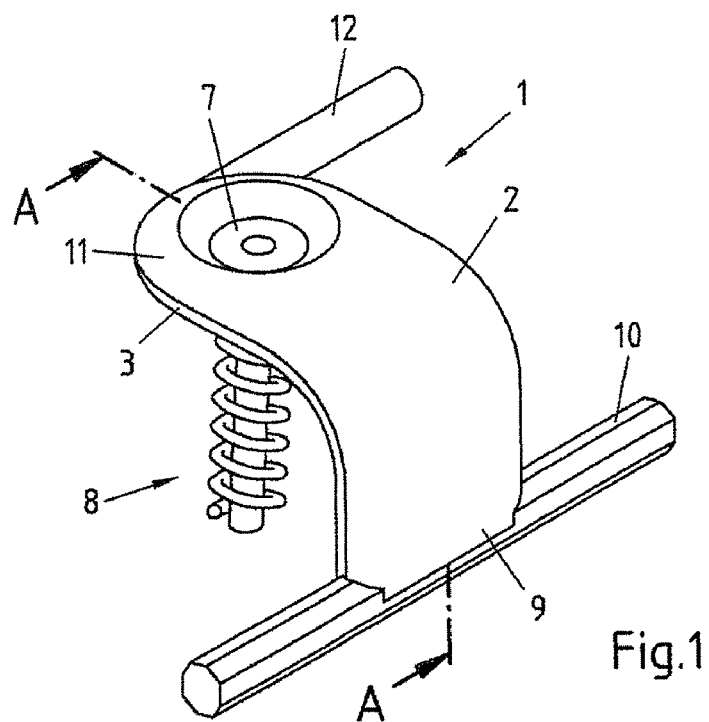
FIG. 1: A bodywork structure with integrated suspension strut dome for a front wheel in cut-out form, in isometric representation.
Figure 2:
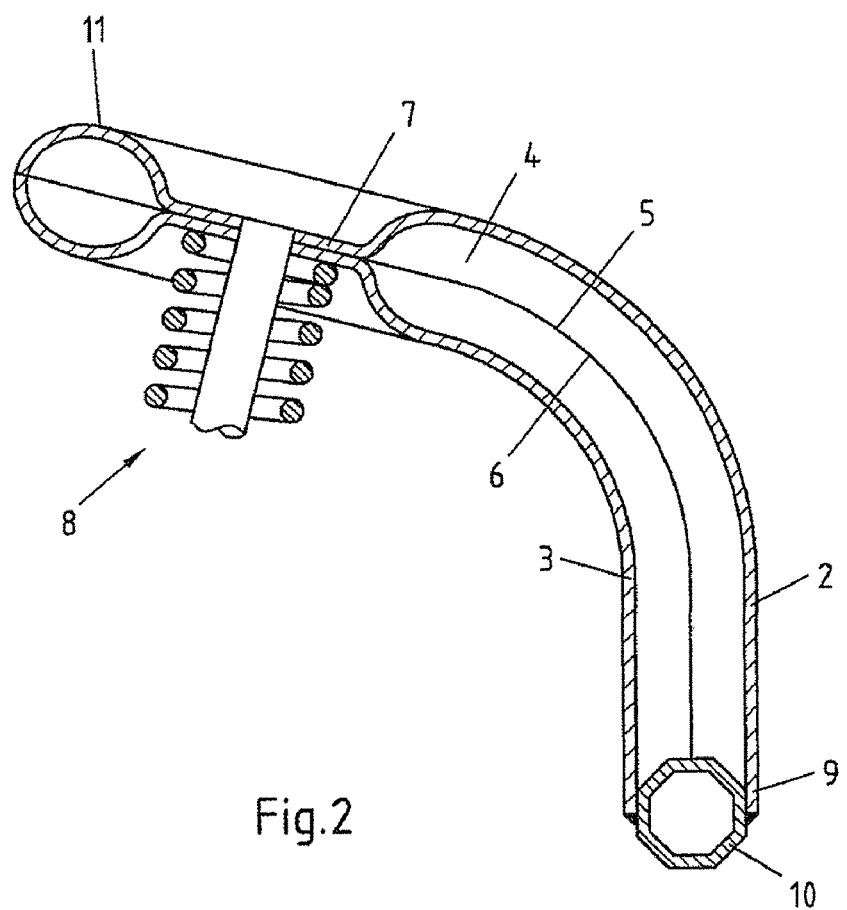
FIG. 2: The suspension strut dome according to FIG. 1 in cross-section according to the line A-A.
Figure 4A:
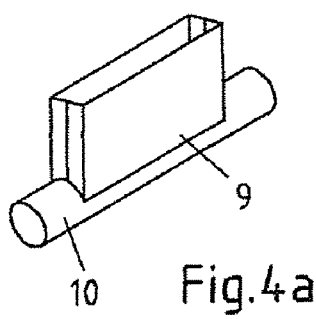
FIGS. 4*a-c*: Various connections of hollow profiles to the suspension strut dome of the bodywork structure, in isometric representation.
Figure 4B:
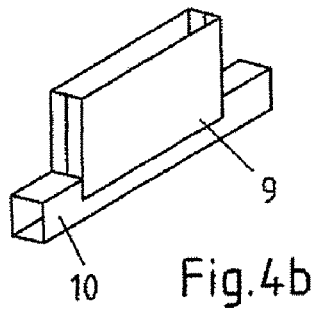
Figure 4C:
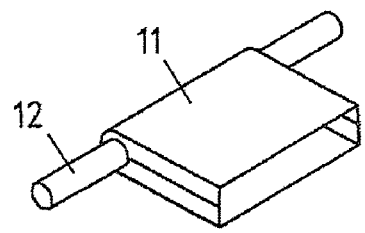

The suspension strut dome 1 represented in FIGS. 1 and 2 in a bodywork structure of a motor vehicle is formed from two half-shells 2, 3, which form a cavity 4 between them, in that they abut one another with their outer edges 5, 6, and are secured to one another, especially by metallurgical joining. In the support area 7 of a suspension strut 8, the two half-shells 2, 3, are drawn in and lie flat on top of one another. A longitudinal load-bearing member designed as a hollow profile 10 is partially enclosed by one lower end 9. In this area, the end 9 of the suspension strut dome 1 and the hollow profile 10 are metallurgically joined, for example by welding. At the upper end 11 of the suspension strut dome 1, an upper longitudinal load-bearing member, likewise designed as a hollow profile 12, is connected laterally in a corresponding manner. The connections are formed depending on the shape of the hollow profiles 10, 12. In the embodiments of FIGS. 4a, 4b, lateral connections are represented. In the embodiment in FIG. 4c the representation is of the upper longitudinal load-bearing member 12 being conducted through the end 11 of the suspension strut dome 1 and being enclosed by it.

Figure 3:
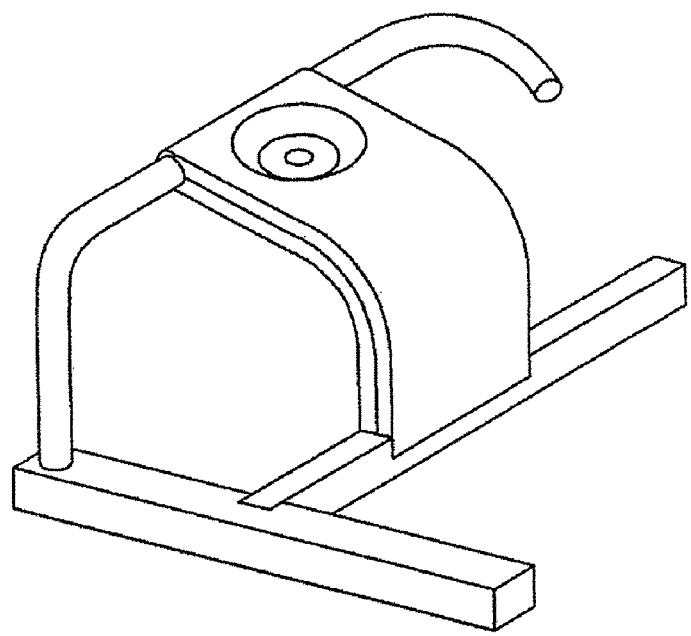
FIG. 3: A bodywork structure with integrated suspension strut dome for a rear vehicle wheel in cut-out form, in isometric representation.

FIG. 3 shows a design for the suspension strut dome of a rear vehicle wheel. In this situation, for the lower longitudinal load-bearing member the connection from FIG. 4b is provided, and for the upper longitudinal load-bearing member the connection from FIG. 4c.

Figure 5:
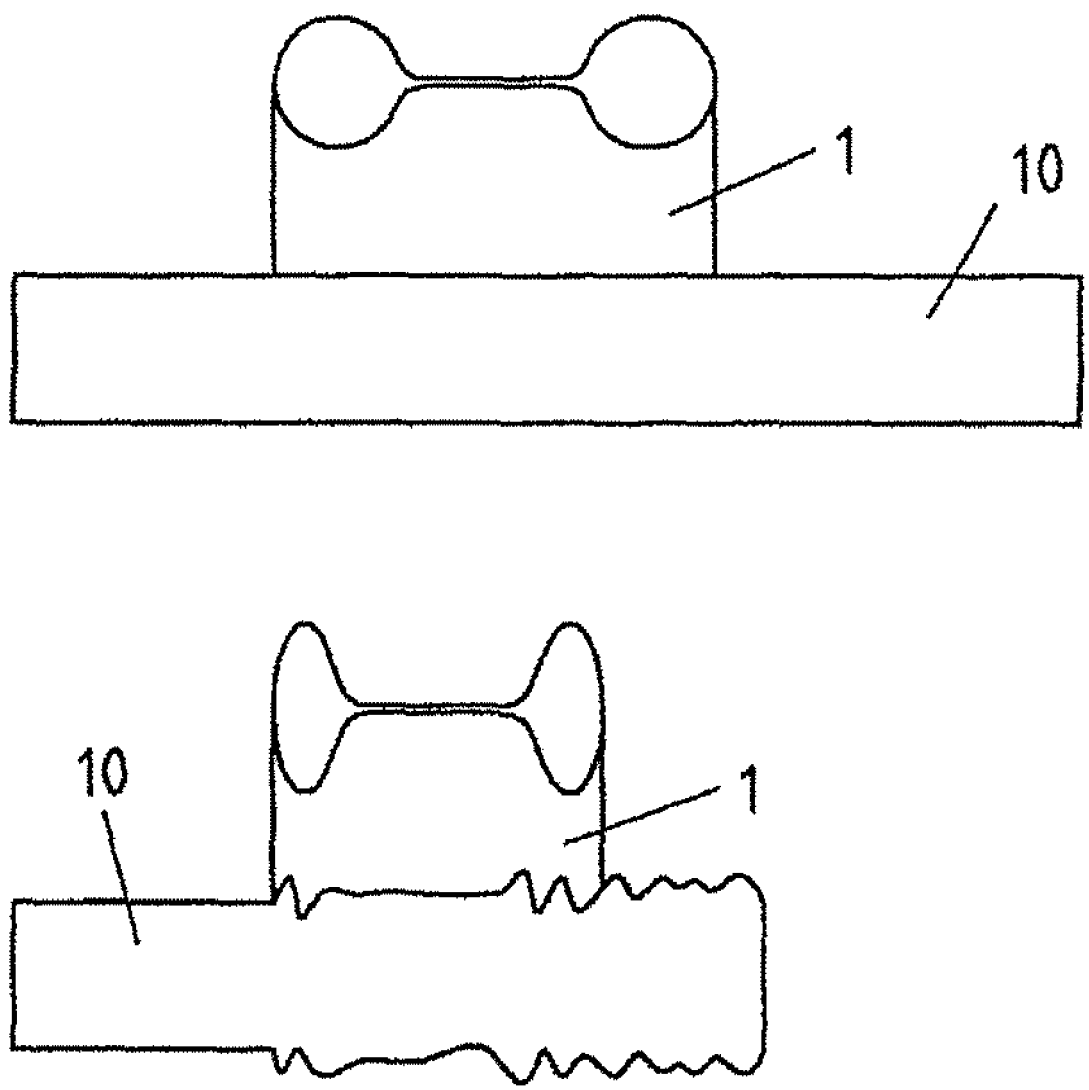
FIG. 5: The suspension strut dome connected to a longitudinal load-bearing member of the vehicle structure at the top, before and below after a crash.

From the comparison of the suspension strut dome 1 with the lower longitudinal load-bearing member in FIG. 5 it can be seen that in the event of a crash the suspension strut dome 1 plays a part in the area of the cavities in the buckling of the hollow profile 9 of the longitudinal load-bearing member.

Figure 6:
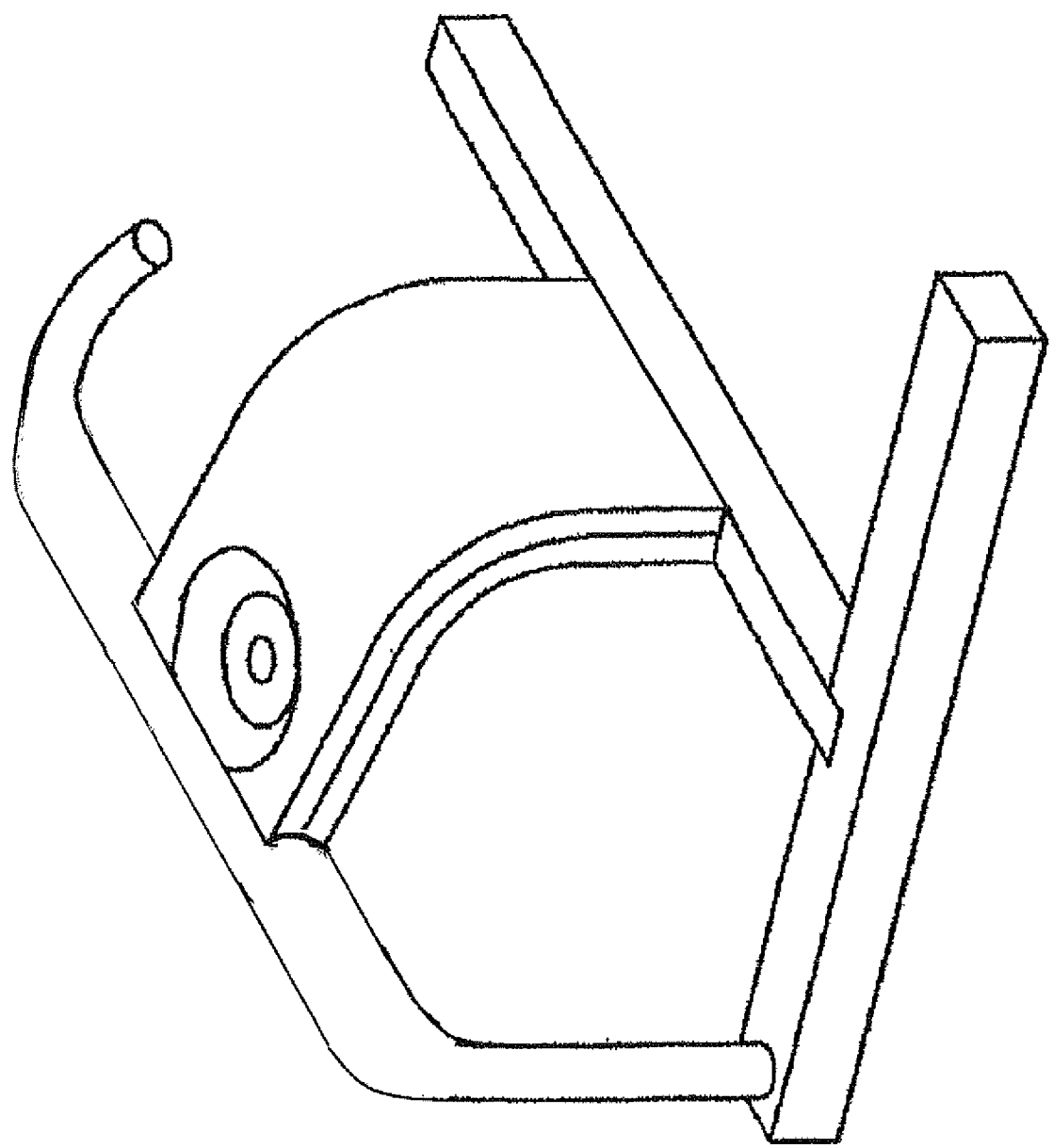
FIG. 6: A bodywork structure with integrated suspension strut dome for a rear vehicle wheel.

FIG. 6 shows an exemplary embodiment of a bodywork structure with integrated suspension strut dome for a rear vehicle wheel in cut-out form, in isometric representation, for FIG. 3, wherein the hollow profiles 10 and 12 are both enclosed by the suspension strut dome.

The invention claimed is:

1. Bodywork structure of a motor vehicle, which is formed from longitudinal and transverse load-bearing members designed as hollow profiles and which has a suspension strut dome, which is formed as a shell made of sheet steel with a sheet reinforcement in the support area of a suspension strut and forms a connection node for adjacent hollow profiles of the bodywork structure, wherein the suspension strut dome is formed from two half-shells, which form a cavity between them and which are in contact with one another in the support area of the suspension strut and are securely connected to one another at their outer edges.

2. Bodywork structure according to claim 1, wherein the connection of the outer edges of the two half-shells is free of any overlap.

3. Bodywork structure according to claim 2, wherein the outer edges abut one another.

4. Bodywork structure according to claim 1, wherein the hollow profiles of the bodywork structure partially enclose with their ends the suspension strut dome serving as a connection node, and are connected by metallurgical joining.

5. Bodywork structure according to claim 1, wherein the hollow profiles of the bodywork structure are enclosed by the suspension strut dome serving as a connection node and are connected to it by metallurgical joining.

* * * * *